Aug. 12, 1952     S. G. Å. BAUMER     2,606,367
DISTANCE METER
Filed Oct. 22, 1949
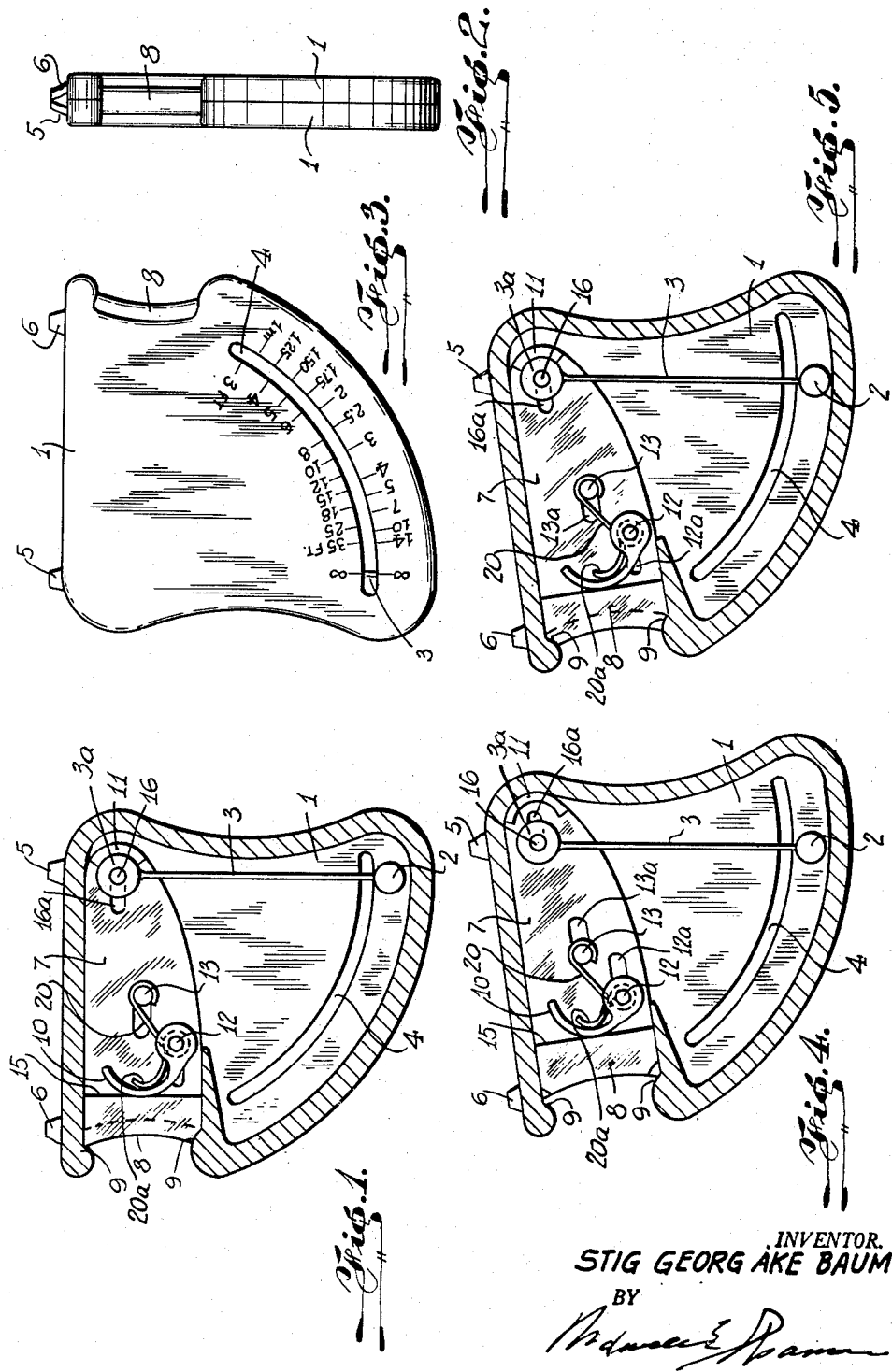
INVENTOR.
STIG GEORG ÅKE BAUMER
BY
ATTORNEY.

Patented Aug. 12, 1952

2,606,367

UNITED STATES PATENT OFFICE 2,606,367

DISTANCE METER

Stig Georg Åke Baumer, Traneberg, Sweden, assignor to Gerhard Ludvigsen, Oslo, Norway Application October 22, 1949, Serial No. 123,053
In Sweden September 25, 1948

1 Claim. (Cl. 33—71)

The present invention relates to a distance-meter, by means of which distances of length may be measured on the basis of a trigonometric principle without the use of measuring tapes or cords or the like.

A distance-meter according to the invention is characterized by a plummet, oscillatingly suspended in a casing by means of a rigid plummet wire, said wire forming a right angle with the upper edge of the casing, if said edge is horizontally levelled, and being braked up in resting position by a slide, which is longitudinally slidable in the casing, said slide, when measuring a distance by inclining the upper edge of the casing in an angle to the horizontal level, is releasing the plummet so that it, freely oscillating, takes the perpendicular position, whereupon the slide again locks the plummet wire in the position, taken relatively to the upper edge of the casing, so that said position may be read off on a scale arranged on the outside of the scale.

The invention will be nearer described in the following specification with reference to the accompanying drawing which, by way of example, schematically shows an embodiment of the invention.

Fig. 1 shows the interior of one-half of the casing.

Fig. 2 shows the distance meter in a front view.

Fig. 3 shows a lateral view of the exterior.

Fig. 4 shows the interior with the casing tilted and the brake disengaged.

Fig. 5 shows the interior with the casing tilted and the brake in engagement.

In the drawing, 1 denotes the casing, consisting of two halves of such a shape that it will fit to the hand. In one corner of the casing a plummet 2 is by means of a relatively thin, rigid steel wire 3 suspended and oscillatingly journalled. The casing is provided with an arc-shaped slot 4, through which a portion of the steel wire may be observed. Outside the slot there is provided a scale from ∞ and lower. The plummet has the position ∞, when the upper edge of the casing is horizontally levelled, Fig. 3. On the upper edge there is placed a sight 5 and a fore-sight 6, by means of which it is possible to take sight at that point, the distance of which to the observer should be measured by means of the distance-meter. In the illustrated embodiment, the meter is completed by an inclination scale for measuring heights, based upon a suitable horizontal distance between the observer and a low point near the ground on the object, the height of which is to be measured.

In the casing 1 is a slide 7, the front edge of which projects outside the casing and is retained within shoulders 9 inside the casing. Slide 7 is provided with brake 11, shoulder 15 and the three slots 12a, 13a and 16a, respectively. As shown in Figs. 1 and 5, brake 11 is in engagement with hub 3a of pendulum or steel-wire 3, preventing the same from free swinging and causing the same to be stopped in any desired location in accordance with the invention. In Fig. 4, the brake 11 is shown free of hub 3a, since slide 7 is pushed inward against the rear wall. Slots 12a, 13a are provided to clear pins 12, 13 which are part of casing 1. One end of spring 20 is wound around pin 13; the center portion of spring 20 then winds in one or two loops around pin 12, while the free end 20a of spring 20 rests against arm 10 which pushes against shoulder 15 of slide 7, urging slide 7 outward against shoulders 9 and thus bringing brake 11 into contact with hub 3a. The brake device 11 arranged at the opposite end of the slide, through the elastic force of spring 20, locks the plummet 2 in its position, but when a pressure is put on the front edge 8 of the slide, the plummet will be released so that it freely oscillating, will turn to the perpendicular position.

The distance-meter according to the invention may be used in the following manner:

The distance-meter is kept in the hand almost nearly as a pistol, the front edge 8 of the slide 7 acting as a pull of a gun. By the sight and fore-sight 5, 6 it is sighted at that point on the ground, the distance of which to the observer should be measured. During this operation the upper edge of the meter is inclined and thus the fore-sight 6 is lowered. After having taken sight at the point in question, the slide 7 is pushed in, so that the brake device 11 releases the plummet 2, which now can turn to the perpendicular position. Still sighting at the point, the distance of which is to be measured, the grip on the front edge 8 of the slide is loosened, whereupon the brake 11 will lock the plummet in the position given by the angle of the sight-line to the horizontal level, which position of the steel-wire 3 can be observed through the slot 4, and the measured distance may then be read off on the scale on the outside of the casing.

It is apparent that various modifications may be made in the meter without departing from the spirit of the invention.

Having now described and ascertained the nature of my invention, what I claim as new and desire to protect by Letters Patent, is:

A distance meter of the described character comprising a flat wall member having a peripheral wall extending therearound to define a casing space at one side of said flat wall, said peripheral wall including a straight portion defining a sighting edge, a pivot pin carried by said flat wall and extending into said casing space adjacent one end of said sighting edge, a hub rotatable on said pivot pin and having a rigid wire extending radially therefrom and carrying a plummet for oscillating movement within said casing space, a scale on said flat wall for indicating the inclination of said rigid wire relative to said sighting edge, said peripheral wall having an interruption therein adjacent the other end of said sighting edge, guide means extending from said flat wall parallel to said straight portion to define a guideway opening at said interruption, a slide member reciprocatable in said guideway along a path parallel to said sighting edge and formed with an elongated slot receiving said pivot pin, spring means continuously urging said slide member to project at one end from said casing space through said interruption, said slide member being disposed between said flat wall and said hub, and a braking member on said slide member adjacent said slot in the latter and engageable with said hub to restrict swinging of the plummet when said slide member is in its spring urged position with said one end projecting from said casing space, said braking member releasing said hub when said slide member is displaced in the direction moving said one end of the slide member into said casing space.

STIG GEORG ÅKE BAUMER.

REFERENCES CITED

The following references are of record in the file of this patent:

UNITED STATES PATENTS

| Number | Name | Date |
|---|---|---|
| 741,501 | Johnson | Oct. 13, 1903 |
| 1,116,452 | Lorraine | Nov. 10, 1914 |
| 2,249,728 | Cross | July 22, 1949 |
| 2,531,147 | McFarland | Nov. 21, 1950 |

FOREIGN PATENTS

| Number | Country | Date |
|---|---|---|
| 133,479 | Austria | May 26, 1933 |
| 336,224 | Italy | Feb. 14, 1936 |
| 566 | Great Britain | Dec. 21, 1738 |